Dec. 6, 1938.   G. J. BLUM   2,139,147
SAW BLADE SUPPORTING AND CLAMPING DEVICE
Filed April 8, 1936
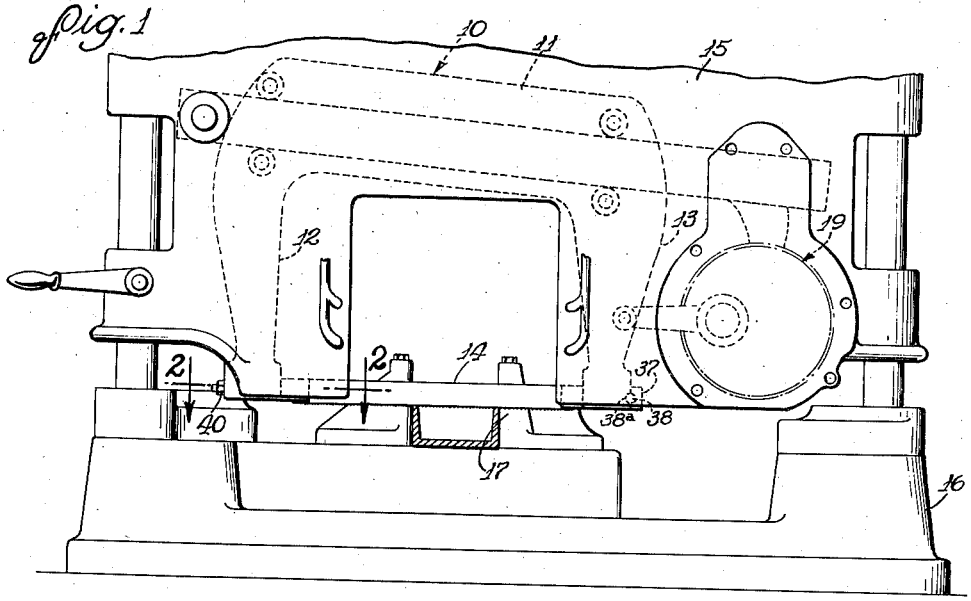
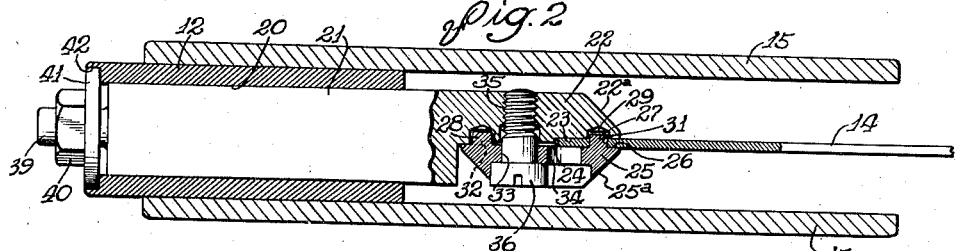
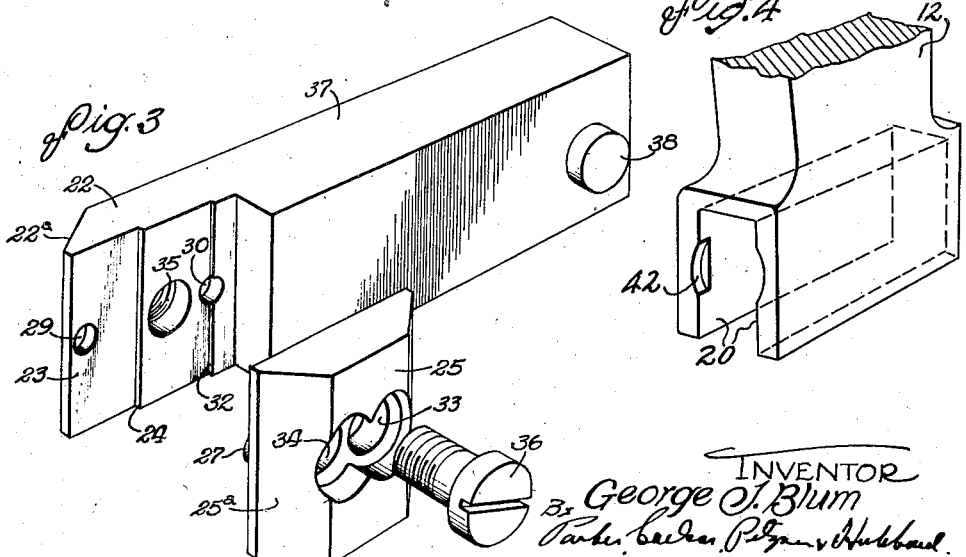
INVENTOR
George J. Blum
ATTORNEYS Patented Dec. 6, 1938

2,139,147

UNITED STATES PATENT OFFICE 2,139,147

SAW BLADE SUPPORTING AND CLAMPING DEVICE

George J. Blum, Chicago, Ill., assignor to Armstrong-Blum Mfg. Co., Chicago, Ill., a corporation of Illinois Application April 8, 1936, Serial No. 73,280

2 Claims. (Cl. 145—35)

My invention relates to hack saws and more particularly to devices for detachably securing the saw blades therein.

It is an object of my invention to provide an improved arrangement for detachably securing a saw blade on a hack saw frame or the like, which facilitates adjustment of the blade with respect to the frame and detachment of the same therefrom so that these operations may be performed with celerity and with a minimum amount of adjustment of the parts of the device.

Another object of my invention is to provide an improved device for detachably connecting a saw blade on a hack saw frame or the like, which presents a maximum length of the blade free of obstruction, thereby increasing the permissible stroke of the blade and consequently increasing the efficiency of its operation and minimizing the resharpening required.

A further object of my invention is to provide an improved clamping and supporting arrangement for a hack saw blade or the like which is exceedingly simple in construction and economical to manufacture, and which is at the same time rugged in construction and adapted to withstand very heavy stresses during the operation thereof.

Further objects and advantages of my invention will become apparent as the following description proceeds and the features of novelty which characterize my invention are pointed out with particularity in the claims annexed to and forming a part of this specification.

For a better understanding of my invention, reference may be had to the accompanying drawing in which:

Figure 1 is a side elevation of a power driven hack saw provided with a blade clamping and supporting arrangement embodying my invention.

Fig. 2 is an enlarged detail view, in section along the line 2—2 in Fig. 1, of the clamping device for the front end of the blade.

Fig. 3 is an exploded perspective view of the clamping device for the rear end of the blade of the hack saw shown in Fig. 1.

Fig. 4 is an enlarged detail perspective view of the front end of the hack saw frame adapted to receive the blade clamp as shown in Figs. 1 and 2.

Referring to the drawing, I have shown in Fig. 1, for purposes of illustration of a particular embodiment of my invention, a power driven hack saw provided with a blade supporting and clamping arrangement embodying my invention, although it will be apparent to those skilled in the art that clamping devices embodying my invention may also be used with various other types of saws, such as hand hack saws, for example. The particular machine illustrated includes a U-shaped saw frame 10 provided with a yoke portion 11 and downwardly extending spaced front and rear arms 12 and 13, respectively. A saw blade 14 is detachably secured to the free ends of the arms 12 and 13 by my improved clamping devices described below. The saw frame 10 is supported within a hollow vertically movable housing 15 preferably made of cast metal and supported on a base 16 provided with a clamp 17. The saw is reciprocated by a suitable power operated driving mechanism 19 mounted on the housing 15. The operating mechanism need not be described here in detail, since such devices are well known in the art.

Alined slots or recesses are formed in the free ends of the arms 12 and 13, the slot 20 formed in the arm 12 being shown in Fig. 2. The improved clamping devices which I have provided for supporting the opposite ends of the saw blade 14 are mounted in the slots formed in the ends of the arms 12 and 13, and are so arranged that they may be readily inserted or removed through the open lower sides of the slots (see Fig. 4). These devices also include an arrangement for tensioning the blade 14 and for simultaneously securing the clamping devices within the slots as an incident to such tensioning of the blade.

In the particular arrangement illustrated, the clamping device or blade holder for the front end of the blade 14 includes a shank or supporting member 21 preferably rectangular in form and which is slidably mounted in the slot 20. The inner end of the shank 21 is provided with an integral axially extending fixed clamping jaw 22 having a flat clamping surface 23 formed in the notched end portion thereof. The clamping surface 23 is arranged substantially in the plane of the longitudinal axis of the shank 21, being displaced approximately half the thickness of the blade 14 above the same as viewed in Fig. 2. A transverse shoulder 24 is formed at the inner edge of the clamping surface 23, the height of the shoulder 24 being approximately equal to the thickness of the blade.

A movable jaw, preferably in the form of a separable block 25, is provided with a flat clamping surface 26 on the inner face thereof, which cooperates with the fixed jaw clamping surface 23 to clamp the end of a saw blade interposed therebetween. The movable jaw 25 is provided with a pair of integral laterally projecting anchoring elements 27 and 28 which extend into complementary recesses 29 and 30 formed in the fixed jaw 22. The anchoring elements 27 and 28 are preferably arranged substantially on the longitudinal center line of the movable jaw 25 and are symmetrically disposed with respect to the transverse center line thereof. It will be noted that the recess 29 is formed in the clamping surface 23 of the fixed jaw 22 and the anchoring element 27 extends through an aperture 31 in the saw blade 14, thus operatively engaging the same and holding it against endwise movement.

The fixed jaw 22 is provided with a second transverse shoulder 32 which is offset with respect to the clamping surface 23 thereof and forms a fulcrum for the movable clamping jaw 25. The shoulder 32 rises above the shoulder 24 a sufficient distance so as to support the rear portion of the movable jaw above the blade while the front portion thereof is pressed tightly into engagement with the blade. The jaws are detachably secured together by means acting on them between the fulcrum shoulder 32 and the outer portion of the clamping surfaces 23 and 26 thereof so that the clamping surfaces are forced tightly into engagement with the interposed end of the saw blade 14. In the particular device illustrated a pair of apertures 33 and 34 are formed in the movable jaw 25, these apertures being arranged on the longitudinal center line of the movable jaw and positioned to alternatively register with a tapped hole 35 formed in the fixed jaw 22 when the movable jaw is turned end for end. A screw 36 inserted in the registering holes serves to hold the clamping jaws in firm clamping engagement with the saw blade.

It will thus be seen that only a small portion of the end of the saw blade need be inserted into the clamping device in order to hold the same rigidly in position because of the combined action of the fulcrumed clamping jaws and anchoring element. As a result, a maximum amount of the length of the saw blade may be utilized for cutting purposes, thus increasing the efficiency of the saw as well as the useful life thereof. The block 25 is preferably made of hardened steel in order that it will withstand the heavy strains imposed thereon by the pressure on the saw blade. Due to the symmetrical arrangement of the parts of the movable jaw 25, it may be turned end for end so that either of the anchoring elements 27 or 28 may be used to engage the saw blade. As a result, the useful life of the movable jaw 25 is practically doubled.

The noses or front faces of the clamping jaws 22 and 25 are preferably beveled as indicated at 22ᵃ and 25ᵃ. As a result they are less likely to be chipped or broken upon accidentally striking the work piece but will instead have a greater tendency to force the work piece, or other obstruction, aside.

The clamping and supporting device positioned at the rear end of the blade 14 is substantially identical with that for the front end of the blade described above, and consequently need not be described here in detail. In general, the clamping device for the rear end of the blade includes a shank 37 slidably mounted in a slot formed in the free end of the rear frame arm 13. The shank 37 is provided with a fixed jaw and movable jaw which are identical with those described above and, consequently, the same reference numerals have been applied thereto.

A laterally extending projection 38 is formed on the side of the shank 37 and is adapted to engage a notch or recess 38ᵃ (see Fig. 1) formed in the rear edge of the lower portion of the arm 13. Consequently, when the blade 14 is moved to the left as viewed in Fig. 1, the projection 38 is moved into its complementary recess and maintains the shank 37 in position within its supporting slot. This tensioning movement of the blade 14 is imparted thereto by an arrangement which preferably includes a threaded stud 39 formed on the outer end of the shank 21 and arranged substantially in alinement with the blade 14. A nut 40 is threaded on the stud 39 and bears against a pressure washer 41 positioned in a vertically extending recess 42 formed in the front edges of the side walls of the recess 20 (Fig. 4). Thus, when the shanks 21 and 37 are positioned within their respective slots and the nut 40 is screwed onto the stud 39, the washer 41 is pressed against the adjacent lower portion of the arm 12. As a consequence, the shank 21 is moved longitudinally in the slot 20, tensioning the blade 14 so that the clamping devices are held firmly in position on the frame 10. Whenever it is desired to remove the saw blade from the frame, this operation may be quickly and readily accomplished simply by loosening the nut 40 which permits the shanks 21 and 37, and the attached blade 14, to be moved downward out of engagement with the frame.

It will be noted that the saw blade 14 is accurately positioned substantially on the vertical medial plane of the frame 10 in view of the symmetrical construction of the parts of the supporting arrangement. Consequently great vertical pressure may be applied to the saw blade through the frame without danger of twisting or skewing the blade.

Although I have described and illustrated a particular embodiment of my invention in connection with a power driven hack saw, it should be understood that I do not desire to limit my invention to the particular construction illustrated, and I intend in the appended claims to cover all modifications within the spirit and scope of my invention.

I claim as my invention:

1. A blade holder for a hack saw or the like comprising a pair of cooperating separable jaws provided with opposed clamping surfaces, one of said jaws having a pair of blade anchoring elements projecting from the clamping surface thereof and arranged substantially on the longitudinal center thereof, the other of said jaws being provided with complementary recesses adapted to receive said anchoring elements, one of said recesses being formed in the clamping surface of said other jaw, a transverse shoulder on said other jaw providing a fulcrum for said one jaw, said other jaw having an aperture therein intermediate the recess, said one jaw having a pair of alined apertures therein intermediate said anchoring elements and arranged to be alternately placed in registry with said first named aperture when said one jaw is turned end for end and said anchoring elements are alined with said recesses, and means insertable into said registering apertures for detachably securing said jaws together in clamping relation with either of said anchoring elements positioned to engage a saw blade interposed between said jaws.

2. A blade holder for a hack saw or the like comprising a shank having a fixed jaw extending longitudinally therefrom, said fixed jaw being provided with a clamping surface lying substantially in the plane of the axis of said shank and having a transverse shoulder at the inner edge thereof, a separable block forming a movable jaw and provided with an elongated clamping surface oppositely positioned with respect to said clamping surface on said fixed jaw and cooperating therewith to clamp the end of a saw blade interposed therebetween, said movable jaw having a pair of blade anchoring elements projecting from the clamping surface thereof and arranged substantially on the longitudinal center line thereof, said fixed jaw being provided with complementary recesses adapted to receive said anchoring elements, one of said recesses being formed in the clamping surface of said fixed jaw, a second offset shoulder formed on said fixed jaw adjacent the base thereof and forming a fulcrum for said separable block, said fixed jaw having an aperture therein intermediate said recesses, and said movable jaw having a pair of alined apertures therein intermediate said anchoring elements and positioned to be alternately placed in registry with said first named aperture when said movable jaw is turned end for end and said anchoring elements are alined with said recesses, and means insertable into said registering apertures for detachably securing said jaws together in clamping relation with either of said anchoring elements positioned to engage a saw blade interposed between said jaws.

GEORGE J. BLUM.